(12) United States Patent
Zettervall

(10) Patent No.: US 9,136,040 B2
(45) Date of Patent: Sep. 15, 2015

(54) JOINT INCLUDING TWO SECTIONS OF A POWER CABLE AND A METHOD FOR JOINING TWO SECTIONS OF A POWER CABLE

(71) Applicant: ABB Technology Ltd, Zurich (CH)

(72) Inventor: Bjorn Zettervall, Nattraby (SE)

(73) Assignee: ABB Technology Ltd (CH)

( * ) Notice: Subject to any disclaimer, the term of this patent is extended or adjusted under 35 U.S.C. 154(b) by 0 days.

(21) Appl. No.: 14/471,624

(22) Filed: Aug. 28, 2014

(65) Prior Publication Data

US 2014/0367164 A1     Dec. 18, 2014

Related U.S. Application Data

(63) Continuation of application No. PCT/EP2013/052232, filed on Feb. 5, 2013.

(60) Provisional application No. 61/604,875, filed on Feb. 29, 2012.

(51) Int. Cl.
*H01B 7/18*     (2006.01)
*H01B 13/26*     (2006.01)
(Continued)

(52) U.S. Cl.
CPC .............. *H01B 7/1875* (2013.01); *H01B 7/14* (2013.01); *H01B 7/226* (2013.01); *H01B 9/00* (2013.01);
(Continued)

(58) Field of Classification Search
CPC .......... H01B 7/1875; H01B 9/00; H01B 7/14; H01B 7/226; H01B 13/06; H01B 13/26; H02G 1/14; H02G 15/117; Y10T 29/49195

USPC ............ 174/88 R, 68.1, 75 R, 74 R, 84 R, 90
See application file for complete search history.

(56) References Cited

U.S. PATENT DOCUMENTS 4,416,061 A     11/1983   Aanerud et al.
5,804,767 A *    9/1998   Winfield et al. ............ 174/74 R
(Continued)

FOREIGN PATENT DOCUMENTS

EP      1553675 A2    7/2005
JP    2002209320 A    7/2002
(Continued)

OTHER PUBLICATIONS

International Search Report and Written Opinion of the International Searching Authority Application No. PCT/EP2013/052232 Completed: Jan. 9, 2014; Mailing Date: Jan. 16, 2014 6 pages.

*Primary Examiner* — Angel R Estrada
(74) *Attorney, Agent, or Firm* — Whitmyer IP Group LLC

(57) ABSTRACT

A joint including two sections of an electric power cable, each cable section including at least one core member surrounded by a first armoring layer for protecting the core member from tensile forces acting on the cable, the first armoring layer including a plurality of armoring wires arranged along the length of the cable and twisted in a first direction with respect to the longitudinal direction of the cable. The joint includes at least one core joint between the core members of the cable sections, and an outer mechanical casing surrounding the at least one core joint and mechanically connected to the first armoring layers of the cable sections, and a second armoring layer positioned in an area neighboring the casing, surrounding at least one of the cable sections, and having one end mechanically connected to the casing and the other end terminated at a distance from the casing.

15 Claims, 2 Drawing Sheets

(51) Int. Cl.
*H02G 1/14* (2006.01)
*H02G 15/117* (2006.01)
*H01B 7/14* (2006.01)
*H01B 7/22* (2006.01)
*H01B 9/00* (2006.01)
*H01B 13/06* (2006.01)

(52) U.S. Cl.
CPC ............... *H01B 13/06* (2013.01); *H01B 13/26* (2013.01); *H02G 1/14* (2013.01); *H02G 15/117* (2013.01); *Y10T 29/49195* (2015.01)

(56) References Cited

U.S. PATENT DOCUMENTS

| | | | |
|---|---|---|---|
| 8,609,988 B2 * | 12/2013 | Sagawa et al. | 174/84 R |
| 8,686,290 B2 * | 4/2014 | Orini | 174/68.1 |
| 8,895,856 B2 * | 11/2014 | McCullough et al. | 174/75 R |
| 8,981,224 B2 * | 3/2015 | Kehl et al. | 174/84 R |

FOREIGN PATENT DOCUMENTS

| | | |
|---|---|---|
| WO | 2004040347 A1 | 5/2004 |
| WO | 2008145691 A2 | 12/2008 |

* cited by examiner

A - A

JOINT INCLUDING TWO SECTIONS OF A POWER CABLE AND A METHOD FOR JOINING TWO SECTIONS OF A POWER CABLE

FIELD OF THE INVENTION

The present invention relates to a joint including two sections of an electric power cable, each cable section comprising at least one core member surrounded by an armouring layer for protecting the core member from forces acting on the cable.

The present invention also relates to a method for joining two sections of an electric power cable. The present invention also relates to use of the method according to the invention for joining three-phase sea cables. Particularly, the invention relates to a high voltage power cable. With high voltage is meant voltages above 1 kV.

BACKGROUND OF THE INVENTION

Electric power sea cables are laid down on the bottom of the sea and often extend a long distance. Due to the long distance, one or more cables must be joined together to provide a cable with a suitable length. The jointing of the cables is done onboard a ship during laying of the cable. Further, sometimes the cable has to be repaired and during the repair the cable sections must to be joined together. The repair of the cables are also carried out onboard a ship.

A three phase high voltage sea cable includes three core members. Each core member includes a conductor surrounded with insulation and an outer protective sheet. The core members are twisted with respect to the longitudinal direction of the cable. The three core members are surrounded by at least one tensile armouring layer including armouring wires for strengthening the cable against tensile forces. The armouring wires are arranged along the entire length of the cable and twisted in a first direction with respect to the longitudinal direction of the cable. Due to the twisted armouring layer, the cable has a natural torsional rigidity in one direction and can take up torsional forces in that direction.

In some applications, for example deep water applications, it is necessary to further strengthen the cable against tensile forces. This is done by providing another tensile armouring layer arranged along the entire length of the cable and surrounding the first armouring layer in order to further strengthen the cable. Cables having one tensile armouring layer are denoted single armoured cables, and cables having two tensile armouring layers are denoted double armoured cables. Since a double armouring wire is heavy and expensive to produce, it is only used in a few applications that require extra strengthening of the cable. WO2008/145691A2 discloses an example of a double armoured sea cable for high voltage applications.

However, single armoured cables are used in most applications.

The cables are sometimes exposed to torsional forces when the cables are laid down on the bottom of the sea. Due to the fact that the core members are twisted with respect to the longitudinal direction of the cable, the cable has a natural torsional rigidity in one direction and can take up torsional forces in that direction. In a single armoured cable, the armouring wires are twisted with respect to the longitudinal direction of the cable in a direction opposite to the direction of the core members. The consequence of this is that the twisted core members provide torsional rigidity in one direction and the twisted armouring layer provides torsional rigidity in the opposite direction.

When two cable sections are joined together, the armouring layers of cable sections close to the joint are opened to provide sufficient space to join the cable sections. The core members are removed from the armouring layers. The core members are rewound a suitable distance from the ends of the cable sections, so that core members are no longer twisted, to enable joining of the core members. Thereafter, the core members are mechanically attached to each other so that three core joints are formed between the cable sections. The core joints between the core members are covered by an outer mechanical casing. The core members are now parallel in a region close to the joint. The armoring layer of each cable section is added back to surround the core members, and the armoring layers are mechanically connected to the outer mechanical casing. Thus, a stiff three part joint is created between the cable sections.

A problem with mounting a stiff three part joint between the cable sections of a single armoured cable is that the natural torsional rigidity of the cable is lost in an area close to the joint. Torsional forces acting on the cable cannot be taken up in a normal way in the area close to the joint, which may lead to functional impairment of the armouring wires. Further, there is a risk that torsional forces are transferred to the joined core members.

SUMMARY OF THE INVENTION

An object of the present invention is to alleviate the above mentioned problems with jointed single armoured cables, and to prevent the joints and joined core members from undesired torsional forces.

According to one aspect of the invention, this object is achieved by a joint according to the present teachings.

The joint includes two sections of an electric power cable, each cable section comprising at least one core member surrounded by a first armouring layer for protecting the core member from tensile forces acting on the cable, the first armoring layer including a plurality of armoring wires arranged along the length of the cable and twisted in a first direction with respect to the longitudinal direction of the cable. The joint further comprises at least one core joint between the core members of the cable sections, and an outer mechanical casing surrounding the at least one core joint and mechanically connected to the first armoring layers of the cable sections. The invention is characterized in that the joint also comprises a second armouring layer positioned in an area neighboring the casing, surrounding at least one of the cable sections, and having one end mechanically connected to the casing and the other end terminated at a distance from the casing, and the second armouring layer includes a plurality of elongated armoring elements wound twisted in an opposite direction to the wires of the first armouring layer with respect to the longitudinal axis of the cable in order to increase the torsional rigidity of the area neighboring the casing.

Due to the second armouring layer the torsional rigidity of a single armoured cable is restored in an area close to the joint. Consequently, impact from forces due to rotation of the cable is moved away from the joint to a part of the cable which is not affected by the jointing and accordingly has a normal torsional rigidity. Due to the fact that the armouring elements of second armouring layer is wounded in a direction opposite the winding direction of the wires of the armouring layer on the cable itself, torsional rigidity is achieved in two opposite directions.

The first armouring layer extends along the entire length of the cable section and the second armouring layer is essentially shorter than the first armouring layer. The second armouring layer is only applied in an area neighboring the joint in order to save costs.

According to an embodiment of the invention, the sections include three core members and the core members are parallel in a first region of the cable section close to the mechanical casing and twisted in a second region of the cable section adjoining the first region, and the second armouring layer extends along the first region of the cable section and a distance into the second region. Preferably, the second armouring layer extends between 0.3-1 m into the second region. This embodiment ensures that torsional forces due to rotation of the cable are moved away from the joint to a part of the cable which is not affected by the jointing and accordingly has a normal torsional rigidity.

The length of the second armouring layer also depends on the friction needed to achieve enough torsional rigidity. According to an embodiment of the invention, the length of the second armouring layer is between 2-10 m. This embodiment achieves enough torsional rigidity in most applications.

The number of turns affects the torsional rigidity achieved. According to an embodiment of the invention, the armouring elements of the second armouring layer is twisted at least two turns around the cable, preferably at least five turns around the cable. This embodiment achieves enough torsional rigidity in most applications.

According to an embodiment of the invention, the outer mechanical casing includes a welding member including a first and a second ring shaped part arranged coaxial, the second part having a larger diameter than the first part, and the first armouring layer is attached to the first part and the second armouring layer is attached to the second part. The welding member facilitates the mechanical connection of the armouring layers to the outer mechanical casing and makes it possible to attach the armouring layers to the outer mechanical casing by means of welding.

According to an embodiment of the invention, the cable sections belong to a three phase sea cable including three core members. The present invention is particularly useful for joining cable sections of three-phase sea cables having three core members.

According to an embodiment of the invention, the joint comprises a plurality of clamping elements arranged along the cable section to keep the second armouring layer in a fixed position relative the first armouring layer. This is a simple and cheap way to keep the second armouring layer in a fixed position.

According to another aspect of the invention, the object is achieved by a method for joining two sections.

The method comprises:
removing the first armouring layer of each cable section back to a suitable position where there is sufficient space to join the cable sections,
attaching the core members mechanically to each other so that at least one core joint is formed between the cable sections,
placing an outer mechanical casing surrounding the at least one core joint,
putting back the first armouring layer of each cable section and mechanically connecting the first armoring layer of each cable section to the casing,
providing a second armouring layer including a plurality of elongated armoring elements in an area neighboring the casing and surrounding the first armouring layer,
mechanically connecting the second armouring layer to the casing, and
winding the armoring elements of the second armouring layer twisted in a direction opposite to the direction of the wires of the first armouring layer with respect to the longitudinal axis of the cable in order to increase the torsional rigidity of said area neighboring the casing.

Some of the steps of the method can be made in a different order, for example, the step of winding the armoring elements of the second armouring around the first armouring layer can be done before the step of mechanically connecting the second armouring layer to the casing.

According to another aspect of the invention, the second armouring layer extends along each cable section and terminates at a position further away from the casing than the position which the first armouring layer was removed back to. Preferably, the second armouring layer terminates at a position 0.3-1 m further away from the casing than the position which the first armouring layer was removed back to.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
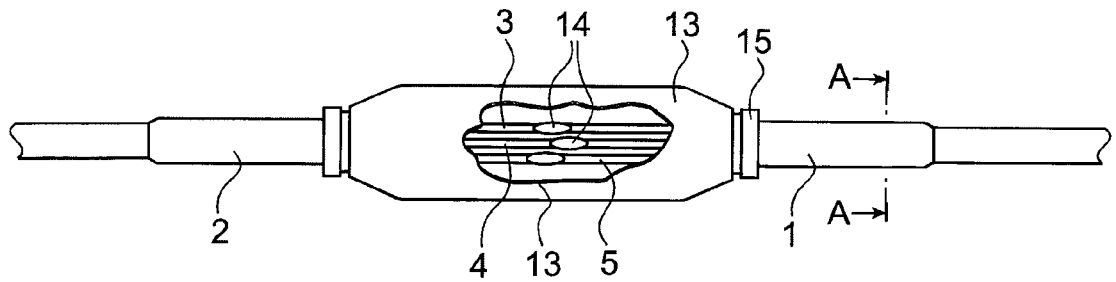
FIG. 1 shows a side view of a joint between two sections of a three phase high voltage sea cables according to an embodiment of the invention.
Figure 2:
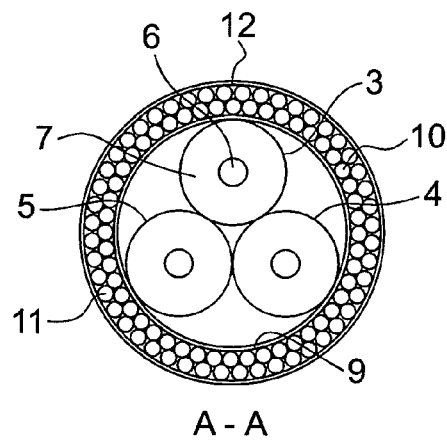
FIG. 2 shows a cross section A-A of the three phase high voltage sea cable shown in FIG. 1.
Figure 3:
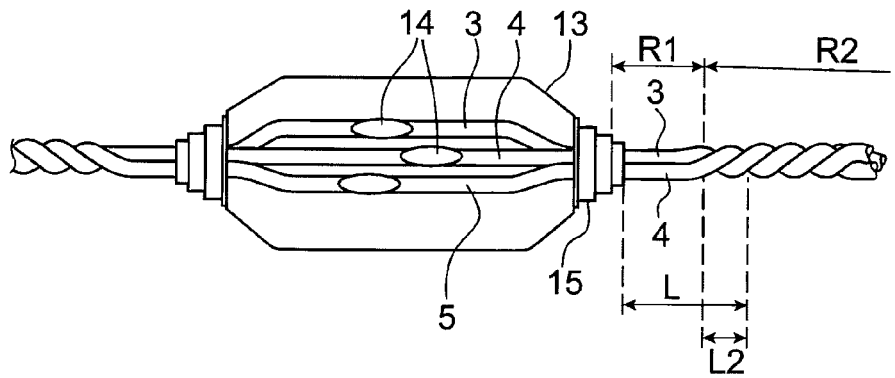
FIG. 3 illustrates a first step of a method for joining two sections of a three phase high voltage sea cable according to an embodiment of the invention.

FIG. 1 shows a side view of a joint including two sections 1, 2 of an electric power cable according to an embodiment of the invention. FIG. 2 shows a cross section A-A of the cable section 1 shown in FIG. 1. The cable is a single armoured cable. Each cable section 1, 2 comprises at least one core member. In a DC cable, the cable section has one core member and in an AC cable, the cable section has tree core members. In the embodiment described in the following, sections of an AC power cable for submarine applications, having three core members 3, 4, 5, are joined together. Each cable core includes an elongated conductor 6 surrounded by an insulating layer 7 and an outer protective sheet acting as a water barrier. The three core members 3, 4, 5 are surrounded by a binder layer 9 that holds the cable cores together. The core members 3, 4, 5 and the binder layer 9 are surrounded by a first armoring layer 10 for protecting the core members from tensile forces acting on the cable. The first armoring layer 10 includes a plurality of armoring wires made of a metal, such as copper, aluminum or iron. FIG. 3 shows the two sections 1, 2 with the first armouring layer removed from the cables.

The cable section 1 further includes a second armoring layer 11 surrounding the first armoring layer 10. The second armouring layer 11 includes a plurality of elongated armouring elements. The armouring elements can be made of a different material and have a different shape compared to the wires of the first armouring layer. The armouring elements can, for example, be wires or flat bars. The armouring elements can, for example, be made of metal such as copper, aluminum and iron, or glass fiber. The armouring elements should preferably be made of a non-extendable material, i.e. a material having a large e-module. The second armouring layer is surrounded by an outer covering yarn 12, for example made of polypropylene.

Figure 4:
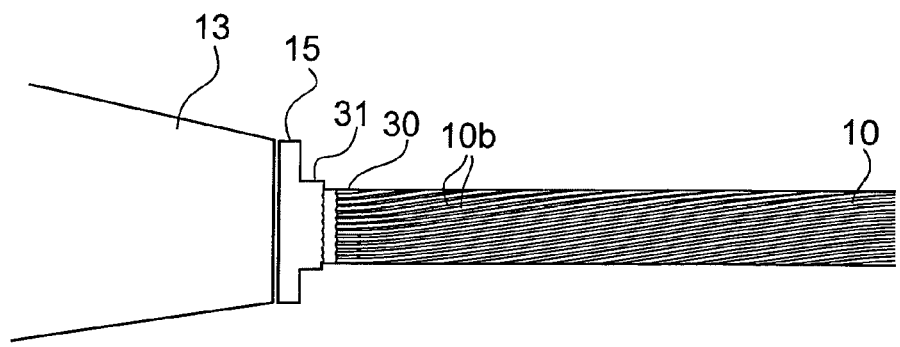
FIG. 4 illustrates a second step of the method for joining two sections of a three phase high voltage sea cable according to an embodiment of the invention.

FIG. 4 shows the first armouring layer 10 in more details. The first armoring layer 10 extends along the entire length of the cable. The first armoring layer includes a plurality of armoring wires 10b arranged along the length of the cable and twisted in a first direction with respect to the longitudinal direction of the cable. The first armoring layer 10 is twisted in unidirectional.

The core members 3, 4, 5 of the sections 1, 2 are joined together. The joint includes core joints 14 between the core members of the cable sections 1, 2 as shown in FIGS. 1 and 3. The joint further includes an outer mechanical casing 13 which surrounds the core joints 14. The outer mechanical casing 13 has a symmetrical shape and has an opening on each side for receiving the cable sections. The outer mechanical casing is mechanically connected to a welding member 15. The joined cable runs through the outer mechanical casing.

Figure 5:
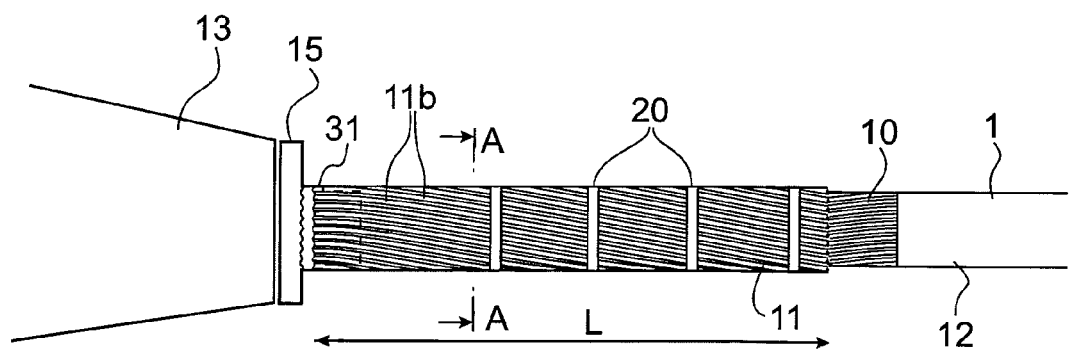
FIG. 5 illustrates a third step of the method for joining two sections of a three phase high voltage sea cable according to an embodiment of the invention.

FIG. 5 shows the second armouring layer 11 in more details. The second armoring layer 11 is wound on the first armoring layer 10. The second armouring layer 11 includes a plurality of armouring elements 11b wound twisted in an opposite direction to the wires of first armouring layer with respect to the longitudinal axis of the cable. One end of the second armouring layer 11 is mechanically connected to the outer mechanical casing 13 via the welding member 15, and the other end of the second armouring layer 11 terminates at a distance from the outer mechanical casing. The length L of the second armoring layer 11 is preferably in the interval of three to nine meters. The length of the second armoring layer is determined depending on the friction so that the armouring elements of the second armouring layer 11 have enough durability against tensile forces, and the length of an opening of the cable during the joining. The second armoring layer is twisted at least two, preferably at least five turns around the cable.

Figure 6:
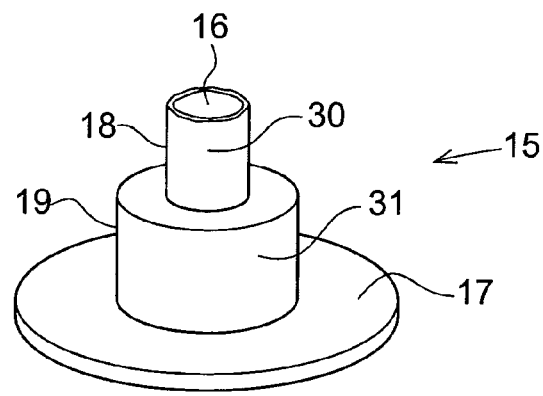
FIG. 6 shows a perspective view of a welding member with a base part, a first part and a second part.

FIG. 6 shows a perspective view of the welding member 15 with more details. The function of the welding member is to facilitate the attachment of the armouring layers to the outer mechanical casing. It is advantageous to use the same type of welding member as is used for attaching a double armored cable to the outer mechanical casing. The welding member 15 is fastened mechanically to the outer mechanical casing 13. The welding member 15 is made of metal, preferably the same metal as the armouring wires. The welding member 15 is ring shaped and has an opening 16 so that the three phase cable goes through the opening. The welding member comprises three parts 17, 18, 19. The three parts are coaxially arranged. A base part 17 of the welding member is adapted for connection to the outer mechanical casing 13. A first part 18 is ring shaped and has a mantle surface 30 in order to receive the first armoring layer 10. The first part is for attaching the first armoring layer 10. A second part 19 is positioned between the base part 17 and the first part 18. The second part 19 is for attaching the second armoring layer 11. The second part 19 is also ring shaped and has a mantle surface 31 in order to receive the second armoring layer 11. The second part 19 has a larger diameter compared to the first part and a smaller diameter than the base part. The height of the second part 19 is shorter compared to the height of the first part 18. The first and second armouring layers 10, 11 are attached to the welding member 15 by means of welding.

One end of the second armouring layer 11 is attached to the mantle surface of the second part 19 of the welding member 15 by means of welding. The other end of the second armoring layer 11 terminates at a distance L from the casing. The second armouring layer 11 is clamped tightly to the cable by a plurality of clamping elements 20 as illustrated in FIG. 5. The clamping elements are, for example, bolting strips, wire looms or cable socks. The clamping elements 20 hold the second armoring layer 11 in a fixed position. The clamping elements 20 are arranged along the second armouring layer with even intervals, for example, the distance between the clamping elements is between 0.1 and 0.5 m.

In the following, a method for jointing two sections of an electric power cable according to an embodiment of the invention is explained with reference to the FIGS. 1, 3, 4 and 5. In a first step, the outer yarn is removed from the end parts of the cable sections. The armouring layers of the end parts of the cable sections are opened to provide sufficient space to join the cable sections. The armoring layer 10 of each cable section is removed back to a suitable position where there is sufficient space to join the cable sections, as shown in FIG. 3. The core members are twisted in the cable. However, to enable joining of the core members, the core members are rewound a suitable distance from the ends of the cable sections. Thereafter, the core members 3, 4, 5 of the cable sections are joined together, as shown in FIG. 3. The core members are mechanically attached to each other so that three core joints 14 are formed between the cable sections. The core joints are covered by an outer mechanical casing 13. The core members are now parallel in a first region R1 close to the casing 13 and twisted in a second region R2 adjoining the first region R1.

In a next step, the first armouring layer 10 of each cable section is put back so that it covers the core members, as shown in FIG. 4. Thereafter, the armoring wires of the first armouring layer 10 of each cable section are mechanically connected to the outer mechanical casing. In this embodiment, the armouring wires are attached to the welding member 15 by welding. The armouring wires of the first armouring layer 10 are welded to the mantel surface 30 of the first part 18 of the welding member 15.

In a next step, a second armoring layer 11 including a plurality of armouring elements are placed surrounding the first armoring layer 10 in an area close to the casing as shown in FIG. 5. The second armoring layer is wound twisted in an opposite direction to the first armoring layer 10 with respect to the longitudinal axis of the cable. One end of the second armoring layer 11 is mechanically connected to the outer mechanical casing 13, via the welding member 15. In this embodiment, the armouring elements of the second armoring layer 11 are attached to the welding member 15 by welding. The armouring elements of the second armouring layer 10 are welded to the mantel surface 31 of the second part 19 of the welding member 15. The other end of the second armoring layer 11 terminates at a distance L from the outer mechanical casing 13. The second armouring layer extends along the length of first region R1 of the cable section and a distance L2 into the second region R2. Preferably, the second armouring layer 11 extends between 0.3-1 m into the second region. Thus, the second armouring layer overlaps a part of the region 2, which has not been affected by the jointing.

The second armouring layer is clamped to the first armouring layer, for holding the second armouring layer in a fixed position relative the first armouring layer. In a last step, the cable sections 1,2 are covered with a new layer of yarn, as shown in FIG. 1.

The present invention is not limited to the embodiments disclosed but may be varied and modified within the scope of the following claims. For example, the invention can also be used on DC cables. The armouring elements and wires may be attached to the outer mechanical casing by another method, for example, by means of bolting strips.

What is claimed is:

1. A joint including two sections of an electric power cable, each cable section comprising at least one core member surrounded by a first armouring layer for protecting the core member from tensile forces acting on the cable, the first armoring layer including a plurality of armoring wires arranged along the length of the cable and twisted in a first direction with respect to the longitudinal direction of the cable, the joint comprising:
    at least one core joint between the core members of the cable sections, and
    an outer mechanical casing surrounding the at least one core joint and mechanically connected to the first armoring layers of the cable sections,
    characterized in that the joint comprises a second armouring layer positioned in an area neighboring the casing, surrounding at least one of the cable sections, and having one end mechanically connected to the casing and the other end terminated at a distance from the casing, and the second armouring layer includes a plurality of elongated armoring elements wound twisted in an opposite direction to the wires of the first armouring layer with respect to the longitudinal axis of the cable in order to increase the torsional rigidity of said area neighboring the casing.

2. The joint according to claim 1, wherein the sections include three core members and the core members are parallel in a first region of the cable section close to the mechanical casing and twisted in a second region of the cable section adjoining the first region, and the second armouring layer extends along the first region of the cable section and a distance into the second region.

3. The joint according to claim 2, wherein the second armouring layer extends a distance between 0.3-1 m into the second region.

4. The joint according to claim 1, wherein the outer mechanical casing includes a welding member including a first and a second ring shaped part arranged coaxial, the second part having a larger diameter than the first part, and the first armouring layer is attached to the first part and the second armouring layer is attached to the second part.

5. The joint according to claim 1, wherein the length of the second armouring layer is between 2-10 m.

6. The joint according to claim 1, wherein the second armouring layer is twisted more than two turns around the cable.

7. The joint according to claim 1, wherein the cable sections belong to a three-phase sea cable having three core members.

8. The joint according to claim 1, wherein the joint comprises a plurality of clamping elements arranged along the cable section to keep the second armouring layer in a fixed position relative the first armouring layer.

9. A method for joining two sections of an electric power cable, each cable section comprising at least one core member surrounded by a first armouring layer for protecting the core member from tensile forces acting on the cable, the first armoring layer including a plurality of armoring wires arranged along the length of the cable and twisted in a first direction with respect to the longitudinal direction of the cable, the method comprising:
    removing the first armouring layer of each cable section back to a suitable position where there is sufficient space to join the cable sections,
    attaching the core members mechanically to each other so that at least one core joint is formed between the cable sections,
    placing an outer mechanical casing surrounding the at least one core joint,
    putting back the first armouring layer of each cable section and mechanically connecting the first armoring layer of each cable section to the casing, characterized in that the method further comprises:
    providing a second armouring layer including a plurality of elongated armoring elements in an area neighboring the casing and surrounding the first armouring layer,
    mechanically connecting the second armouring layer to the casing, and
    winding the armoring elements of the second armouring layer twisted in a direction opposite to the direction of the wires of the first armouring layer with respect to the longitudinal axis of the cable in order to increase the torsional rigidity of said area neighboring the casing.

10. The method according to claim 9, wherein the second armouring layer extends along each cable section and terminates at a position further away from the casing than the position which the first armouring layer was removed back to.

11. The method according to claim 10, wherein the second armouring layer terminates at a position 0.3-1 m further away from the casing than the position which the first armouring layer was removed back to.

12. The method according to claim 9, wherein the armoring elements of the second armouring layer is twisted at least two turns around the cable.

13. The method according to claim 9, wherein the method further comprises clamping the area of the cable sections including the second armouring layer to keep the second armouring layer in a fixed position relative the first armouring layer.

14. The method according to claim 9, wherein the outer mechanical casing includes a ring shaped welding member including a first and a second parts, the second part having a larger diameter than the first part, and the method comprises welding one end of the first armouring layer to the first part of the welding member and welding one end of the second armouring layer to the second part of the welding member.

15. Use of the method according to claim 9 for joining cable sections of a three phase sea cable.

* * * * *